March 4, 1924.
1,486,046
A. H. SMITH
COMPARTMENT FREIGHT CAR
Filed July 29, 1920   3 Sheets-Sheet 1
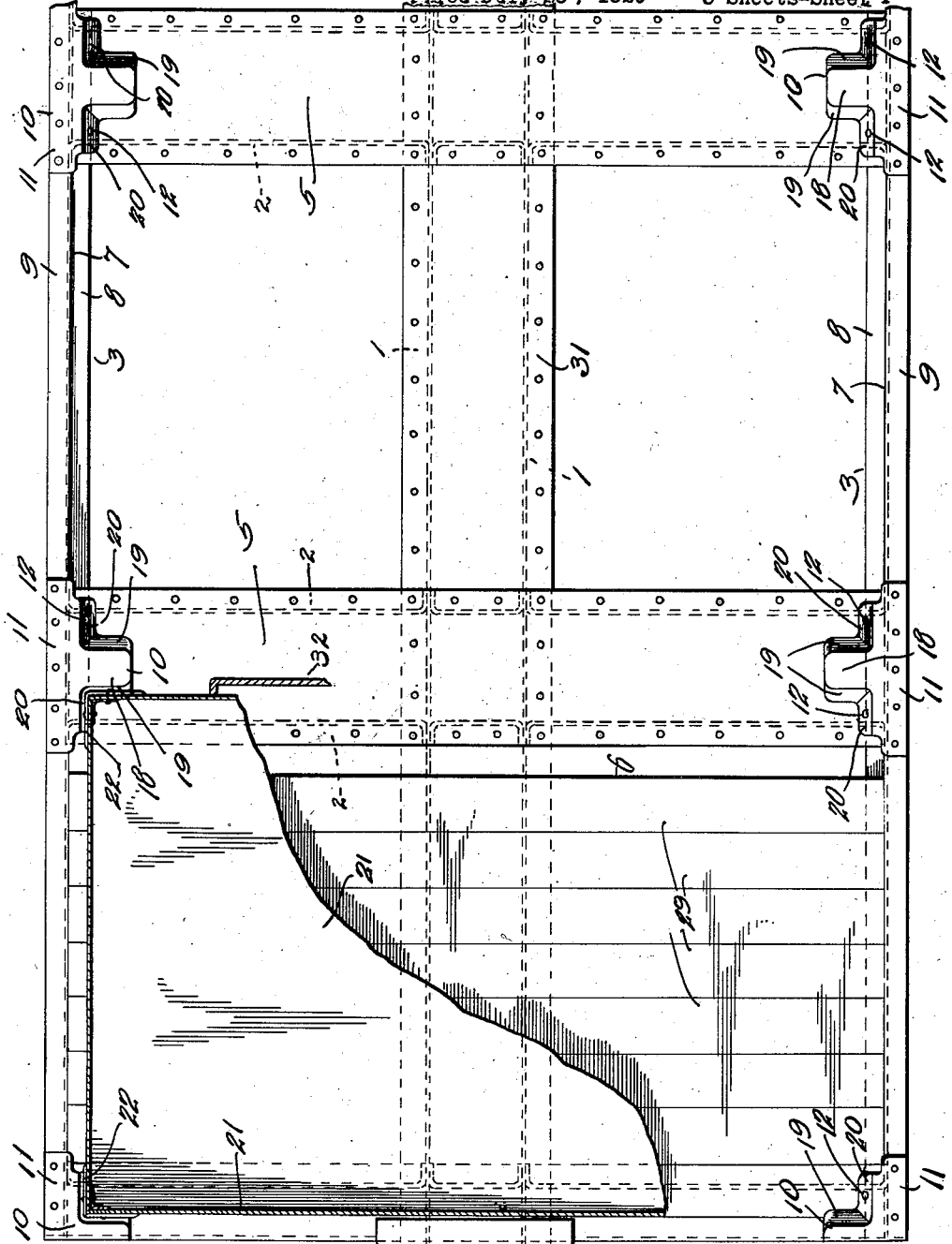

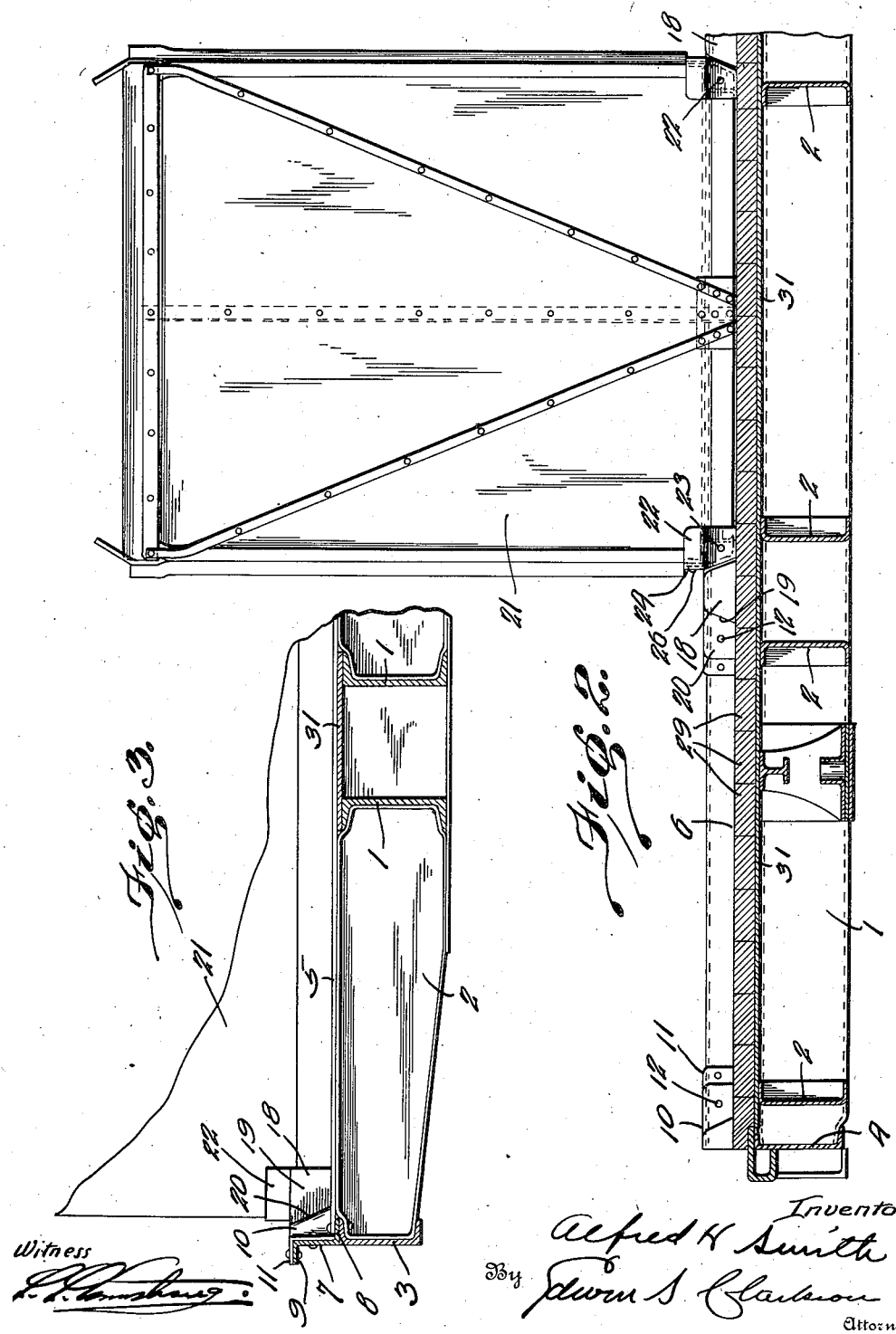

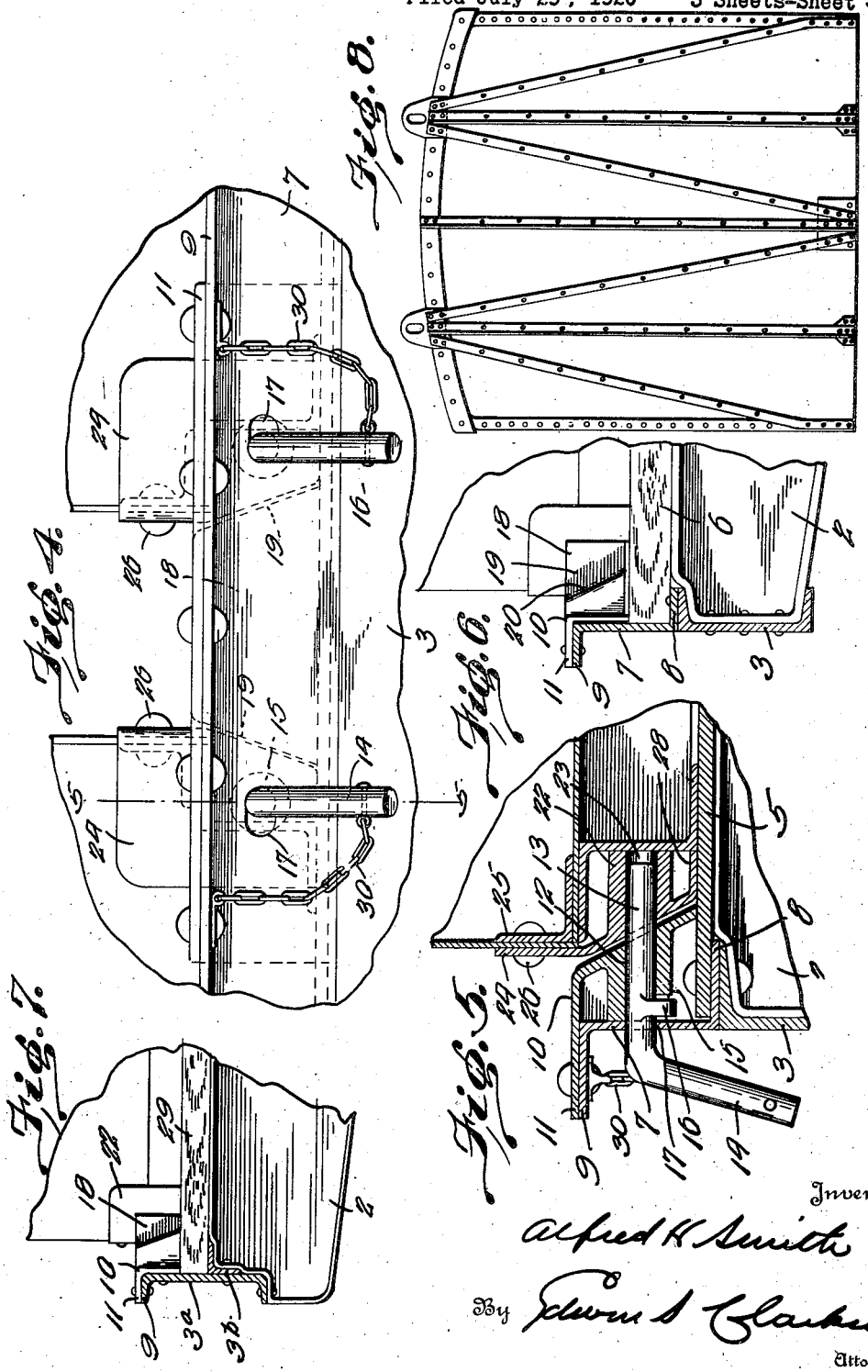

Patented Mar. 4, 1924.

1,486,046

UNITED STATES PATENT OFFICE.

ALFRED H. SMITH, OF NEW YORK, N. Y.

COMPARTMENT FREIGHT CAR.

Application filed July 29, 1920. Serial No. 399,677.

*To all whom it may concern:*

Be it known that I, ALFRED H. SMITH, a citizen of the United States of America, residing at New York city, in the State of New York, have invented certain new and useful Improvements in Compartment Freight Cars, of which the following is a description.

Railroads sustain annually enormous financial losses through claims for freight lost and stolen in transit and at the terminals.

The object of my invention is to provide a plurality of compartments adapted to receive less than car load lots of freight which compartments are loaded and sealed by the shipper at his store or factory and then transported by truck to a railroad station where they are loaded on an especially designed car, said compartments being also sealed by the railroad. When the compartments are loaded onto the car it is impossible to open the compartments even if the locks and seals are broken, thereby eliminating the possibility of theft and loss of goods from the compartment.

A further object of my invention is to provide a convertible skeleton car having seats adapted to receive the compartments and means for locking the compartments on said seats.

In the drawings:

Figure 1 is a top plan view of a portion of a freight car embodying my invention with one compartment, broken away, in position, the compartment being partly in section.

Figure 2 is a longitudinal section of a car embodying my invention with a compartment thereon, the compartment being in side elevation.

Figure 3 is an enlarged detailed transverse section of the car, the compartment being broken away.

Figure 4 is an enlarged detailed side elevation.

Figure 5 is an enlarged sectional view on the line 5—5 Figure 4.

Figures 6 and 7 are enlarged detailed views, parts being in section.

Figure 8 is an end elevation of one of the compartments.

The car which is shown in this application and embodies my invention is of the skeleton type so that a standard wooden floor may be used inasmuch as the underframe is so designed to be used with or without the floor.

The car frame comprises center sills 1, cross-ties 2, side sills 3 and end sills 4. The side sill is a composite sill built up of the channel 3 and the Z bar 7. 5 are comparatively wide flat plates which rest on and cover the top of the cross-ties. As shown in one of the views a portion of the car is provided with a flooring 6.

The Z bar 7 extends along the sides of the car throughout the length of the car, the lower flange 8 of which is secured between the top flange of the channel 3 and the cross-tie plate 5, the web of the bar 7 projecting a substantial distance above the plane of the upper face of the cross-tie plate 5. The flange 9 of the plate 7 projects outwardly beyond the side of the car.

At intervals throughout the length of the car I secure a plurality of seats adapted to receive less than car load lots of freight which seats consist of castings 10 each provided with an outwardly extending flange 11 which is riveted to the upper flange 9 of the Z bar 7.

This casting or seat is provided with a bore 12 open at both ends in which is revolubly mounted a locking key 13 provided with an operating handle 14. In the bottom of the bore 12 is a slot 15 through which projects a lug 16 cast integrally with the key 13. The Z bar 7 is provided with an elongated slot 17 which registers with the bore 12 of the compartment seat 10, said elongated slot extending longitudinally of the car so that when the key 13 is in locked position the lug 16 projects below the elongated slot 17 whereby the key is locked against outward movement and accidental displacement. The seat or casting 10 is provided with a tongue 18 which projects inwardly toward the longitudinal center axis of the car and functions to space compartments on the car from each other and also functions as an abutment to resist movement of the compartments endwise of the car. The two side faces 19 of the tongue and inner faces 20 of the main body of the seat 10 are bevelled as shown in the drawing so that when a compartment is loaded on a car with its four corners each engaging one of the seats 10 the compartment is centered by said inclining faces and brought into wedging engagement with the seats 10.

The compartments 21 are preferably constructed from sheet metal of proper gauge and of a construction to withstand the service conditions to which such compartments will be subjected in use. These compartments have four sides and a roof and are provided with a suitable door which may be sealed. In each lower corner of the compartment I secure a casting 22 which extends below the floor of the same and is provided with a bore 23 adapted to receive the key 13, said casting having an upwardly extending flange 24 which is riveted to one of the vertical walls of the compartment by the same rivet which passes through the angle iron 25 in the bottom of the compartment, said rivet being indicated by the numeral 26. The casting 22 is provided with a lateral inwardly extending foot flange 28. The outer faces of the casting 22 are at right angles to each other and are bevelled downwardly and inwardly so that when the compartment is placed on the car these outer under-bevelled faces of the casting 22 engage the faces 19 and 20 of the seats 10.

When the compartment is seated in the seats 10 the key 13 is moved inwardly through the bore 12 of the seat 10 and the bore 23 of the foot casting of the compartment thereby locking the compartment down on the seats 10 against movement. The weight of the operating handle 14 and lug 16 is sufficient to hold the key against revolution under service conditions so that the key is not at all likely to become disengaged from the bores in the two castings, the lug 16 abutting against the inner face of the Z bar 7 and preventing outward movement of the key.

In one of the views of the drawings I have shown the side sill 3ª of a height equal to the height of the side sill 3 and Z bar 7, otherwise the construction is the same and needs no further description.

When it is desired to use standard wooden flooring on the underframe I place the planks 29 with the ends thereof resting on the flange 8 of the Z bar 7 and on the center sills of the car. In the modification showing the side sills 3ª I rivet an angle iron 3ᵇ to the inner face of the side sill for the purpose of supporting the ends of the flooring planks 29.

I prefer to secure each of the keys 13 to the car structure by means of a chain 30 so as to lock said keys against possible loss.

When the car is used without the flooring the compartments rest on the cross-ties and the four corner seats 10.

When the wooden flooring 29 is placed on the underframe the car may be used as an ordinary flat car for miscellaneous freight, but it will be seen from the drawings that the seats 10 may be so proportioned that when the car is used with wooden flooring the bores in the corner castings of the compartments and the seats 10 will register when the compartments are resting on the wooden flooring.

In the use of my invention the compartments are loaded at the factory or store of the shipper, thereby eliminating wooden containers and after loaded the compartments are locked and sealed by the shipper and thence taken to the car by truck and loaded from the truck onto the car, whereby a second handling and count of the contents of each container by the railroad is eliminated and when it is understood that fully 80 per cent of the way billing of the railroad is due to less than car load lots of freight it will be appreciated that a very material saving in help and expense to the railroad is accomplished by the use of my invention. Further, by the use of these compartments it is impossible for anyone to open them after they have left the shipper until they are delivered to the consignee whereby a very material saving is obtained by the railroads for lost and stolen freight.

The compartments, when loaded on a car, are so positioned that it is impossible to open the door of the compartment while the compartment is on the car even if one should succeed in breaking the seals and locks of the door.

The center sills are also covered by a cover plate 31 similar to the cover plate 5 of the cross-ties.

I have indicated the door of the compartment by the numeral 32.

What I claim is:

1. A car comprising center sills, cross ties and side sills, the side sills projecting above the cross ties; a plurality of castings secured at intervals to the side sills throughout the length of the car and projecting toward the longitudinal center of the car, seats formed on said castings, a plurality of less than car load lot compartments removably mounted on said car in said seats, and means for locking the compartments on said seats and the car.

2. A car comprising center sills, cross ties, and side sills projecting above the cross ties, a plurality of castings secured at intervals to the side sills throughout the length of the car and provided with tongues extending inwardly from the side sills, the inner faces of the castings and side faces of the tongues formed to constitute seats, and a plurality of less than car load lot compartments removably mounted on said seats with said tongues projecting between two adjacent compartments, and means for locking the compartments on said seats and to the car.

3. A skeleton car comprising center sills, cross ties, and side sills, the side sills projecting above the cross ties, flat plates on the top of the cross ties, a plurality of seats on the side sills distributed throughout the length of the car, and a plurality of less than car load lot compartments removably mounted in said seats and resting on said flat plates, and means for locking the compartments in said seats and to the car.

4. A freight car comprising a skeleton underframe, a plurality of seats secured to members of the underframe and distributed throughout the length of the car, a plurality of less than car load lot compartments seated in said seats, and locking means intersecting the joint between the seats and compartments to hold the compartments in said seats and lock them to the car.

5. A car comprising a plurality of seats on the side sills thereof and distributed throughout the length of the car, and a plurality of less than car load lot compartments removably mounted on said car, means on said compartments engaging said seats, and a locking element engaging said seats and said means whereby the compartments are locked to the car.

6. A car comprising center sills, cross ties and side sills, the side sills projecting above the cross ties, a plurality of castings secured at intervals to said sills throughout the length of the car, a plurality of less than car load lot compartments adapted to be mounted on the car, castings secured to the lower corners of each compartment and adapted to engage the castings on the side sills to center the compartment and hold them in position, and locking means engaging both the car and container castings whereby the compartments are locked to the car.

7. A car comprising center sills, cross ties, and side sills, the side sills projecting above the cross ties, a plurality of seats secured at intervals along the sides of the car throughout the length of the car, and positioned above the cross ties, a plurality of less than car load lot compartments adapted to be positioned on said car, independently of each other, projections depending below the floor of each compartment at the corners thereof adapted to engage said seats on the car and means locking said projections on said seats, whereby the compartments are locked on the car.

8. A car comprising center sills, cross ties, and side sills, the side sill structure extending above the cross ties, a plurality of seats secured at intervals to the side sill structure throughout the length of the car, tongues projecting inwardly from said seats toward the longitudinal center of the car and constituting a portion of said seats and functioning as abutments against movement of a compartment endwise of the car, a plurality of compartments adapted to be mounted on the car, supports at the bottom of each compartment adapted to engage said seats and locking means connecting said seats and supports whereby the compartments are locked to the car, the said tongues spacing the compartments from each other and supporting them against endwise thrust.

9. The combination with a less than car load lot compartment, of a casting depending from said compartment at each corner thereof below the floor of the compartment and provided with a key way.

10. The combination with a skeleton car underframe having flat cross ties, a plurality of seats secured at the outer ends of said cross ties, of a plurality of less than car load lot compartments mounted on said car, members secured to the lower corners of the compartments and constructed to engage said seats and locking elements engaging the seats and members thereby locking the compartments to the car.

11. The combination with a skeleton car underframe, having cross ties with flat upper faces, a plurality of seats secured at the outer ends of said cross ties with inwardly bevelled faces, key ways through said seats, of a plurality of compartments mounted on said car, members secured to the lower corners of said compartments and having their outer faces under bevelled and adapted to engage the bevel faces of the said seats, key ways through said members registering with the key ways of the seats and a key seated in each key way whereby the compartments are locked to the car.

12. The combination with a car underframe having center sills, cross ties and a side sill structure, the side sill structure projecting above the upper face of the cross ties, a plurality of seats secured to the side sill structure at intervals throughout the length of the car, key ways extending through said seats, a key way through the side sill structure registering with the key way in each seat, keys movably mounted in said key ways and stops to hold the keys in said key ways against accidental displacement, and an operating handle for each key extending outside of the side sill structure.

13. The combination with a car underframe including center sills, cross ties and side sills, a plurality of seats secured to said bar and projecting inwardly toward the longitudinal center of the car, each provided with a key way, a key removably mounted in said key way and projecting through an opening in the said bar, and a stop to hold the key against outward movement when in locked position.

14. The combination with a car underframe including center sills, cross ties and side sills, flat plates secured on the upper faces of said cross ties, a plurality of seats secured to said side sills at intervals throughout the length of the bar; said seats comprising castings each having a flange overlapping the upper edge of the side sills, a downwardly and outwardly inclined seat face, a key way through said casting intersecting the said seat face, a key removably mounted in said key way, a stop on said key to lock the key against outward movement when in locked position, and an elongated slot in said Z bar through which the handle of the key projects, said slot permitting the withdrawal of the key when the key is in unlocked position.

15. In combination with a carrier body having a floor, a unit container having feet at each corner thereof adapted to rest on said floor, oppositely disposed securing means on the carrier body, said securing means being adapted to engage the feet of the unit container above the floor of the carrier body.

In testimony whereof I affix my signature.

ALFRED H. SMITH.